Oct. 26, 1954

H. H. SMITH 2,692,550

CITRUS FRUIT JUICER

Filed June 30, 1951

INVENTOR.
HOMER H. SMITH
BY
Robert A. Sloman
ATTORNEY

Patented Oct. 26, 1954

2,692,550

UNITED STATES PATENT OFFICE 2,692,550

CITRUS FRUIT JUICER

Homer H. Smith, Detroit, Mich., assignor of one-half to Bonnie O. Smith, Detroit, Mich.

Application June 30, 1951, Serial No. 234,530

1 Claim. (Cl. 100—213)

This invention relates to a citrus fruit juicer construction, and more particularly to an improved citrus juicer which is inexpensive to manufacture and fully effective in its intended purpose.

It is the object of the present invention to provide a novel citrus fruit juicer construction, which has a number of mechanical advantages over prior juicers and which provides an unusual and simplified construction.

This and other objects will be seen from the following specification and claim in conjunction with the appended drawing in which:

It will be understood that the above drawing shows merely a preferred embodiment of the invention, and that the other embodiments are contemplated within the scope of the claim hereafter set out.

The citrus fruit juicer includes a rectangular base 11 and the upright hollow rectangular shaped standard 12, which is secured to said base, such as by the welds 13.

Figure 1:
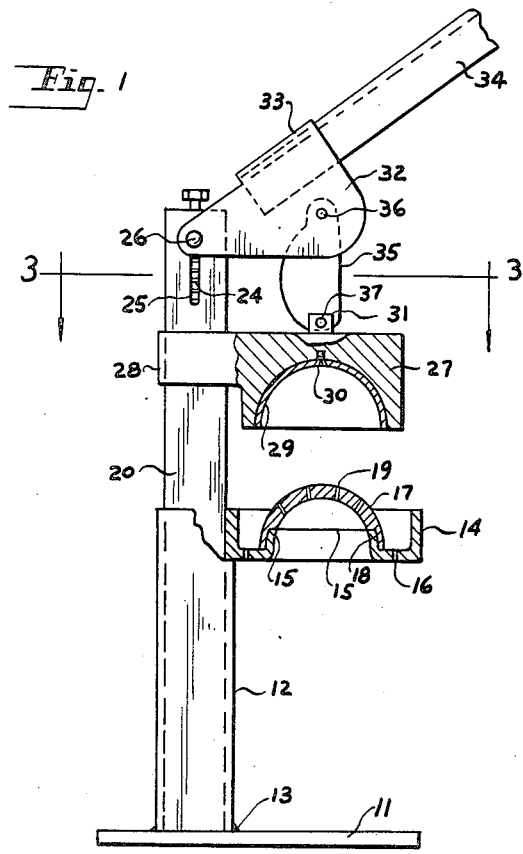
Fig. 1 is a side elevational view of the citrus juicer, partly broken away and sectioned for illustration.

Laterally projecting fruit supporting anvil 14 is secured to or forms an integral part of said standard and projects from its upper end as shown in Fig. 1.

Anvil 14 is cup shaped and has a central apertured circular wall portion 15 and also a plurality of transverse juice openings 16.

Inverted removable cup 17 of substantially hemispherical form is positioned within the anvil 14 with the lower annular peripheral portion 18 thereof cooperatively engaging the inner surface of the annular wall 15 forming the central portion of anvil 14.

Cup 17 is removably positioned within the stationary anvil 14 and is interchangeable with different sizes of similar cups for receiving different sizes or kinds of fruit to be juiced. Said cup includes a plurality of transverse fluid passages 19 whereby fluid juice may descend through the central opening of anvil 14.

Figure 2:
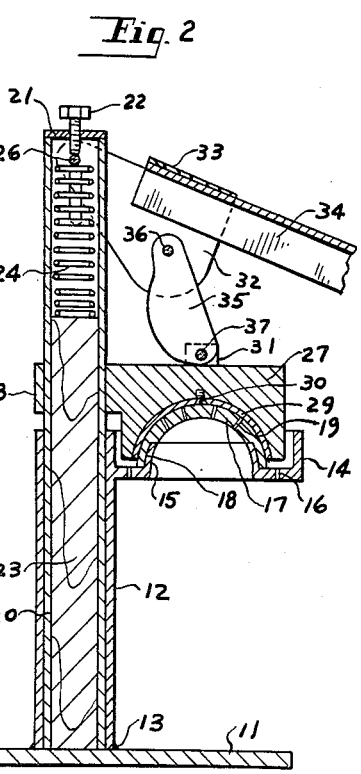
Fig. 2 is an elevational section thereof.

The upright support 20, preferably of hollow construction is positioned down into standard 12 and rests upon the base 11 as shown in Figure 2. Support 20 is preferably rectangular in cross section and has positioned therein the rectangular shaped block 23 upon which is supported coil spring 24 within support 20 as shown in Fig. 2.

Support 20 has a cap 21 at its upper end and adjustably threaded through the central portion of said cap is a bolt 22.

A pair of oppositely arranged upright slots 25 are formed within the side walls of support 20 and are adapted to support and receive the opposite ends of the support shaft 26, which rests upon spring 24. The adjustable bolt 22 engages the upper surface of the shaft 26 for regulating the tension in the spring 24.

Said juicer includes a vertically movable anvil 27, which is cooperable with stationary anvil 14 and the cup 17 therein. The movable anvil 27 has an upright collar 28 upon one side thereof, which is projected over and which receives and operatively engages the upright support 20.

The interior shape of said collar corresponds to the exterior shape of support 20. By this construction the anvil 27 is guidably mounted upon the support 20 for vertical movements thereon in the manner hereafter described.

Anvil 27 has a central hemispherical recess within its under-surface within which is positioned the removable and interchangeable hemispherical cup 29 secured thereon by screw 30 and cooperable with the stationary anvil 14 and its cup 17 in the manner shown in Fig. 2 for expressing juice from a citrus fruit, such as an orange, grapefruit, or lemon.

Upright spaced ears 31 project from the upper surfaces of movable anvil 27 as shown in the drawing.

The bifurcated operating arm 32 with top wall 33 has an operating lever 34 joined thereto and projecting outwardly therefrom.

Arm 32 is pivotally mounted at one end upon the transverse shaft 26. The block or link 35 is pivotally joined by the transverse pin or shaft 36 to an outer portion of operating arm 32. The lower end of the link or block 35 is positioned between the ears 31 on anvil 27 and is pivotally joined thereto by transverse pin or shaft 37.

In operation it is apparent that pivotal movements downward and upward of the operating arm 32 and its handle 34 effect corresponding vertical downward and upward movements of the anvil 27 with respect to anvil 14. Preferably with a fruit half positioned upon the cup 17, the movable anvil 27 projects downwardly and over said fruit with its interior cup 29 compressibly engaging said fruit as supported upon cup 17 to thereby extract the juice therefrom.

The operating arm 32 thus projects the anvil 21 downwardly and forcefully by means of the link 35 to facilitate the squeezing of the fruit.

Figure 4:
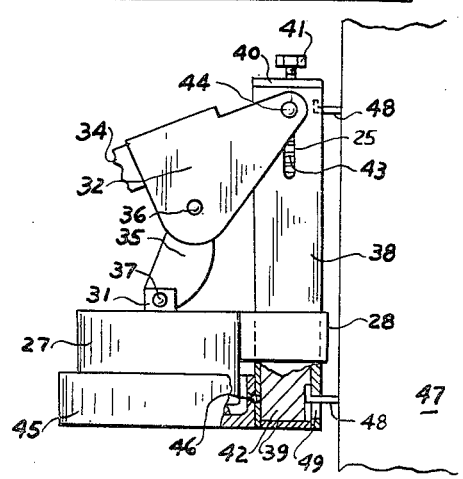
Fig. 4 is an elevational view of a slightly different form of juicer adapted for support upon an upright wall, being partly broken away and sectioned for illustration.

A slightly different embodiment of the invention is shown in Fig. 4 wherein the base and upright standard 11 and 12 are omitted and the juicer is removably or supported upon an upright wall.

The hollow upright support 38 has a cap 39 at its lower end and a cap 40 secured on its upper end and with the latter threadably receiving the manually adjustable bolt 41. The elongated support block 42 is positioned within support 38 and rests upon the cap 39 and at its upper end supports the spring 43, in the same manner as above described in connection with Figures 1 and 2. The transverse shaft 44 rests upon said spring and supports the operating arm 32 in the manner above described with respect to Figure 1.

The stationary anvil 45 may be integral with the lower end of the upright support 38, but is shown in Figure 4 as being secured thereto by the screw or screws 46.

The supporting brackets 48 of L-shape project laterally from the wall 47 in vertically spaced relation and are adapted to extend within the openings 49 in the rear wall of the support 38.

Figure 3:
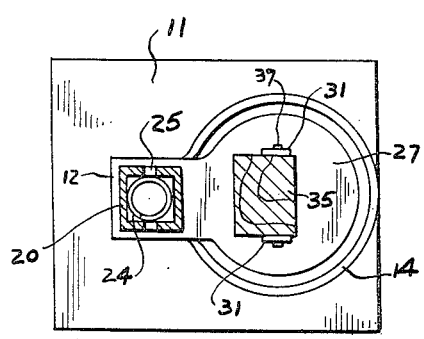
Fig. 3 is a section taken on line 3—3 of Fig. 1.

In all other respects the operation of the juicer is exactly the same as above described with respect to Figures 1, 2, and 3.

It will be noted that the operating arm 32 has a floating support in view of the slots 25 within which its pivotal shaft 44 is positioned. Slots 25 of Figs. 1 and 4 provide a vertically adjustable yielding mounting for pivot pins 26 and 44 respectively, which has been found to be an advantage over a fixed pivotal mounting and gives greater control to the user by permitting raising and lowering of the pivot point for arm 32—34 as desired.

Having described my invention, reference should now be had to the claim which follows for determining the scope thereof.

I claim:

A citrus fruit juicer comprising an upright standard, a laterally positioned stationary cup shaped fruit supporting anvil secured thereon, an upright support or said standard, a vertically reciprocal anvil slidably mounted upon said support above said stationary anvil for compressive registry therewith for expressing juice from a citrus fruit, an operating arm pivotally mounted at one end upon said support above said movable anvil, a link pivotally joined at one end to an outer portion of said arm and pivotally joined at the other end to said movable anvil, said support having a longitudinal slot adjacent its upper end, the pivotal mounting of said arm including a pin extending through said slot and vertically movable therein, a spring within said support supported therein at its lower end with its upper end supportably engaging said pin, and an adjusting screw extending down into said support operatively engaging said pin for regulating the compression of said spring.

References Cited in the file of this patent

UNITED STATES PATENTS

| Number | Name | Date |
|---|---|---|
| 37,577 | Hathaway | Feb. 3, 1863 |
| 136,498 | Fowler | Mar. 4, 1873 |
| 226,166 | Fanning | Apr. 6, 1880 |
| 239,808 | Lehmann | Apr. 5, 1881 |
| 281,378 | Kyser et al. | July 17, 1883 |
| 367,865 | Thompson | Aug. 9, 1887 |
| 625,838 | Devore | May 30, 1899 |
| 678,548 | Dawsey | July 16, 1901 |
| 858,357 | McIntire | June 25, 1907 |
| 1,391,647 | Curtis et al. | Sept. 20, 1921 |
| 1,696,390 | Divine | Dec. 25, 1928 |
| 1,732,353 | Bradley | Oct. 22, 1929 |
| 2,420,678 | Pipkin | May 20, 1947 |

FOREIGN PATENTS

| Number | Country | Date |
|---|---|---|
| 9,410 | Great Britain | 1899 |
| 150,863 | Switzerland | Feb. 1, 1932 |